United States Patent
Tomhave

(10) Patent No.: US 11,872,969 B2
(45) Date of Patent: Jan. 16, 2024

(54) ELECTRO-HYDRAULIC MODULATING VALVE PEDAL ASSEMBLY

(71) Applicant: MICO, Inc., North Mankato, MN (US)

(72) Inventor: Derek J. Tomhave, Mankato, MN (US)

(73) Assignee: ZF OFF-HIGHWAY SOLUTIONS MINNESOTA INC., North Mankato, MN (US)

( * ) Notice: Subject to any disclaimer, the term of this patent is extended or adjusted under 35 U.S.C. 154(b) by 271 days.

(21) Appl. No.: 17/604,132

(22) PCT Filed: Apr. 17, 2020

(86) PCT No.: PCT/US2020/028683
§ 371 (c)(1),
(2) Date: Oct. 15, 2021

(87) PCT Pub. No.: WO2020/214915
PCT Pub. Date: Oct. 22, 2020

(65) Prior Publication Data
US 2022/0219652 A1    Jul. 14, 2022

Related U.S. Application Data

(60) Provisional application No. 62/835,215, filed on Apr. 17, 2019.

(51) Int. Cl.
*B60T 7/04* (2006.01)
*B60T 15/14* (2006.01)

(52) U.S. Cl.
CPC ............... *B60T 7/042* (2013.01); *B60T 15/14* (2013.01)

(58) Field of Classification Search
CPC ................................. B60T 7/042; B60T 15/14
See application file for complete search history.

(56) References Cited

U.S. PATENT DOCUMENTS

| 3,429,340 A | 2/1969 | Opel et al. |
| 6,405,837 B1 | 6/2002 | Muramoto |

(Continued)

FOREIGN PATENT DOCUMENTS

| CN | 207875610 U | 9/2018 |
| JP | S59124450 A | 7/1984 |

(Continued)

OTHER PUBLICATIONS

International Search Report for PCT/US2020/028683 dated Sep. 14, 2020, 4 pages.

(Continued)

*Primary Examiner* — Thomas E Lazo
(74) *Attorney, Agent, or Firm* — WARNER NORCROSS + JUDD LLP

(57) ABSTRACT

An improved electro-hydraulic modulating valve pedal assembly is adapted to control the flow of hydraulic fluid manually through actuation of a pedal, electrically through activation of a solenoid, or in combination through actuation of a pedal and activation of a solenoid. In one embodiment, the pedal assembly includes a pedal that is pivotably mounted to a base, a push rod that is operatively coupled to the pedal, a spool valve that is configured to vary the hydraulic output in response to the position of the push rod, and a solenoid that is magnetically coupled to the push rod. The pedal assembly is well suited for electronic-hydraulic braking control systems, including brake electronic control units for anti-lock braking, emergency braking, and autonomous operation.

20 Claims, 7 Drawing Sheets

(56) References Cited

U.S. PATENT DOCUMENTS

| | | | |
|---|---|---|---|
| 6,866,348 B2* | 3/2005 | Ewel | B60T 8/4827 |
| | | | 303/117.1 |
| 2003/0070715 A1 | 4/2003 | Royle | |
| 2006/0053957 A1 | 3/2006 | Ewel et al. | |

FOREIGN PATENT DOCUMENTS

| | | | |
|---|---|---|---|
| JP | 3667533 B2 | 7/2005 |
| JP | 2017019316 A | 1/2017 |
| KR | 101048745 B1 | 7/2011 |

OTHER PUBLICATIONS

Machine assisted English translation of JPS59124450A obtained from https://worldwide.espacenet.com/ on Nov. 23, 2021, 4 pages.
Machine assisted English translation of JP3667533A obtained from https://patents.google.com/patent on Oct. 28, 2021, 6 pages.
Machine assisted English translation of KR101048745B1 obtained from https://patents.google.com/patent on Oct. 28, 2021, 7 pages.
Machine assisted English translation of JP2017019316A obtained from https://patents.google.com/patent on Oct. 28, 2021, 6 pages.
Machine assisted English translation of CN207875610U obtained from https://patents.google.com/patent on Oct. 28, 2021, 12 pages.

* cited by examiner

US 11,872,969 B2

ELECTRO-HYDRAULIC MODULATING VALVE PEDAL ASSEMBLY

CROSS-REFERENCE TO RELATED APPLICATIONS

This application is the National Stage of International Application No. PCT/US2020/028683 filed on Apr. 17, 2020, which claims priority to and all advantages of U.S. Provisional Patent Application No. 62/835,215 filed on Apr. 17, 2019, the contents of which are incorporated herein by reference.

FIELD OF THE INVENTION

The present invention relates to an electro-hydraulic modulating valve pedal assembly to achieve a desired braking demand and for other applications.

BACKGROUND OF THE INVENTION

A variety of valves are designed for vehicles that are equipped with hydraulic power devices. For example, it is known to provide pedal-actuated hydraulic valves for forestry equipment, agricultural equipment, construction equipment, military equipment, and mining equipment. These hydraulic valves can be installed in conjunction with floor mounted pedals or suspended pedals to provide normal and emergency braking, and to operate industrial equipment.

Hydraulic circuits for pedal-actuated hydraulic valves typically include a pump or an accumulator and include a braking system or an industrial tool. If an accumulator is used, the accumulator can include a charging valve to provide a pressurized hydraulic fluid to the hydraulic brake valve. Known hydraulic brake modulation valves include a pressure port, a tank port, and a working port. These valves are mechanically actuated with a spool for controlling the flow of pressurized hydraulic fluid to the working port for use by the braking system or the industrial tool.

Despite the widespread acceptance of pedal-actuated hydraulic valves, there remains a continued need for an improved hydraulic pedal modulating valve assembly that can be better integrated into electronic control systems, including anti-lock braking (ABS) systems and autonomous driving systems. In particular, there remains a continued need for a hydraulic pedal assembly that can provide hydraulic pressure in response to both foot pedal actuation and electrical control inputs.

BRIEF SUMMARY

An improved electro-hydraulic modulating valve pedal assembly is provided. The electro-hydraulic pedal assembly is adapted to control the flow of hydraulic fluid both manually, through actuation of a pedal, and electrically, through activation of a solenoid. The pedal assembly is well suited for electronic control systems, including brake electronic control units (ECUs) for ABS braking, emergency braking, autonomous operation, and other applications.

In one embodiment, the electro-hydraulic pedal assembly includes a push rod that is mechanically coupled to a pedal, a solenoid that is magnetically coupled to the push rod (having a magnetic armature), and a spool valve that is configured to vary a hydraulic output in response to the force exerted by the push rod. The solenoid surrounds at least a portion of the magnetic armature for applying a magnetic force and driving the push rod in a first (downward) direction, the magnetic force being proportional to an electrical current supplied to the solenoid. The spool valve includes a spool that is concentrically arranged within a valve body, such that movement of the push rod in the first (downward) direction causes a corresponding movement of the spool in the first (downward) direction. In this position, the spool valve provides fluid communication between a pressure port and a work port. A return spring returns the spool valve to the neutral position. In the neutral position, the spool valve provides fluid communication between the working port and a tank port.

In the current embodiment, the electro-hydraulic pedal assembly includes a three-position hydraulic spool valve having two valve operators: a pedal and a solenoid. The hydraulic valve includes a working port coupled to a working unit, a pressure port coupled to a hydraulic pump, and a tank port coupled to a hydraulic reservoir. In the first valve position, the working port is coupled to the tank port to prevent unwanted pressure buildup from actuating the working unit. In the second valve position, all three ports are closed off from each other. In the third valve position, the pressure port is coupled to the working port. The valve operators function independently of each other and in parallel, such that the spool valve can respond to actuation by the pedal—independently of the energized state of the solenoid—and can respond to actuation by the solenoid—independently of the position of the pedal, to rapidly transition from one position to the next, optionally in response to electronic control signals from a brake ECU.

These and other features and advantages of the present invention will become apparent from the following description of the invention, when viewed in accordance with the accompanying drawings and the appended claims.

DETAILED DESCRIPTION OF THE CURRENT EMBODIMENT

Figure 1:
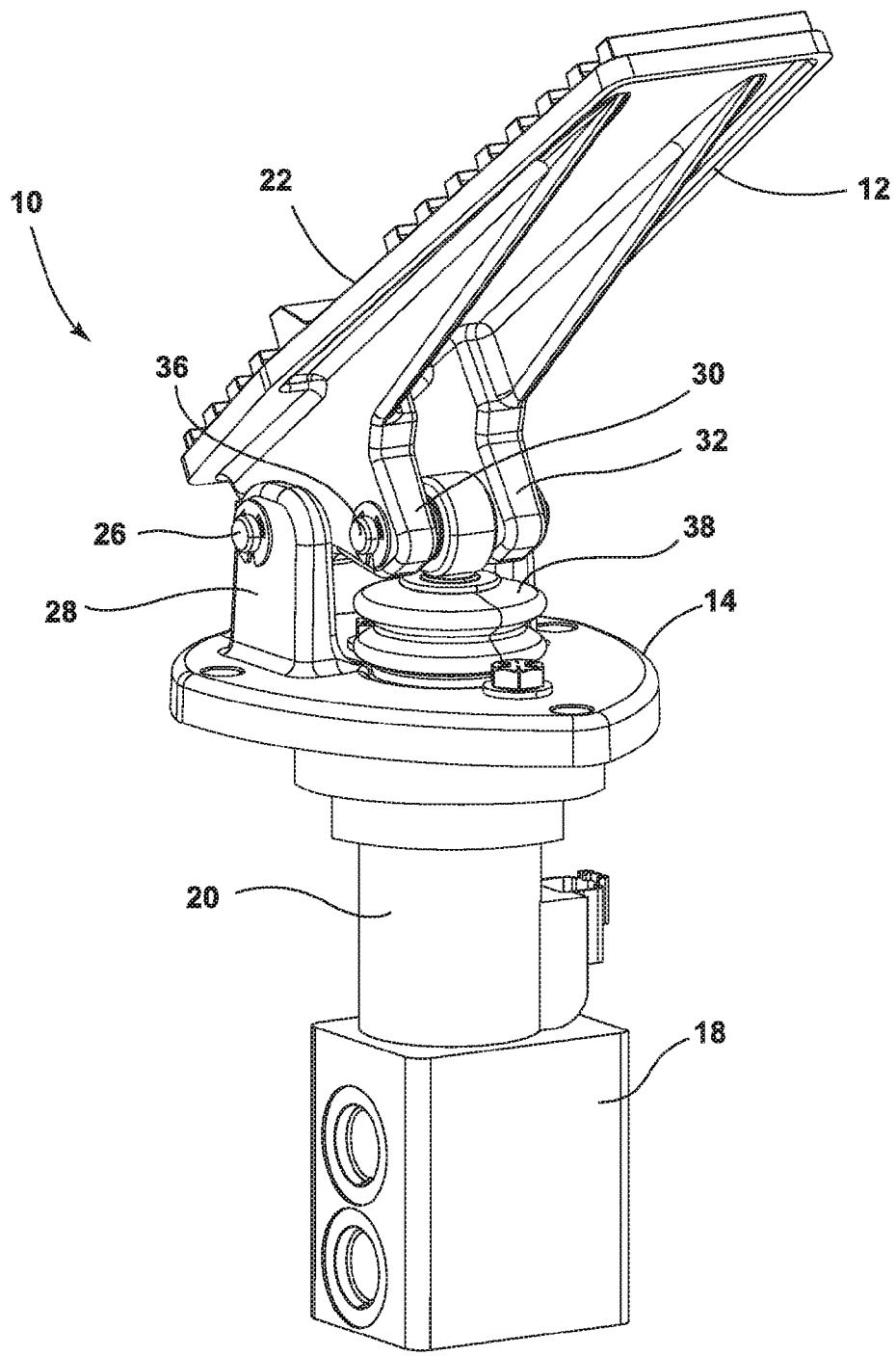
FIG. 1 is a first perspective view of an electro-hydraulic modulating valve pedal assembly in accordance with one embodiment of the present invention.
Figure 2:
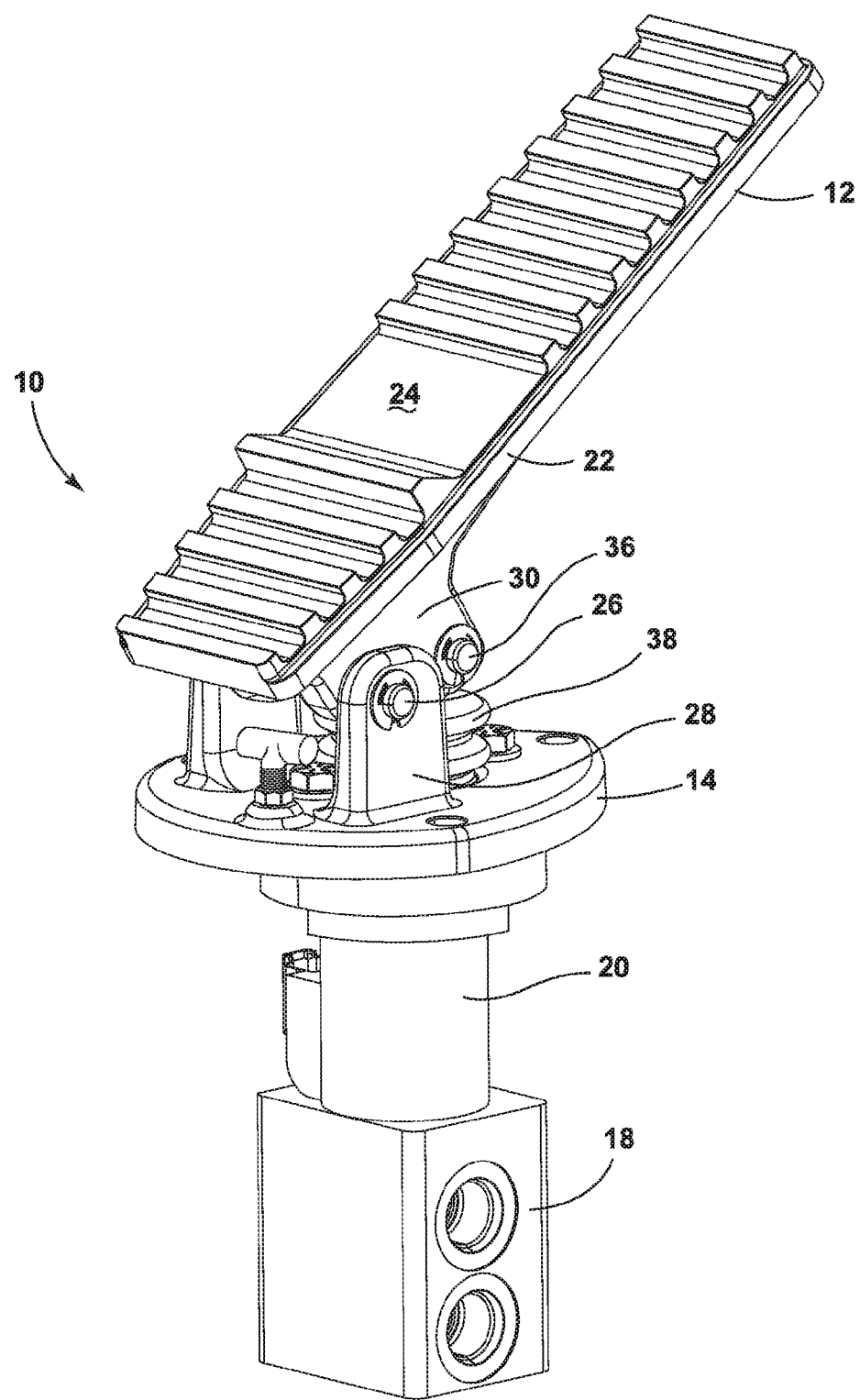
FIG. 2 is a second perspective view of an electro-hydraulic modulating valve pedal assembly in accordance with one embodiment of the present invention.
Figure 3:
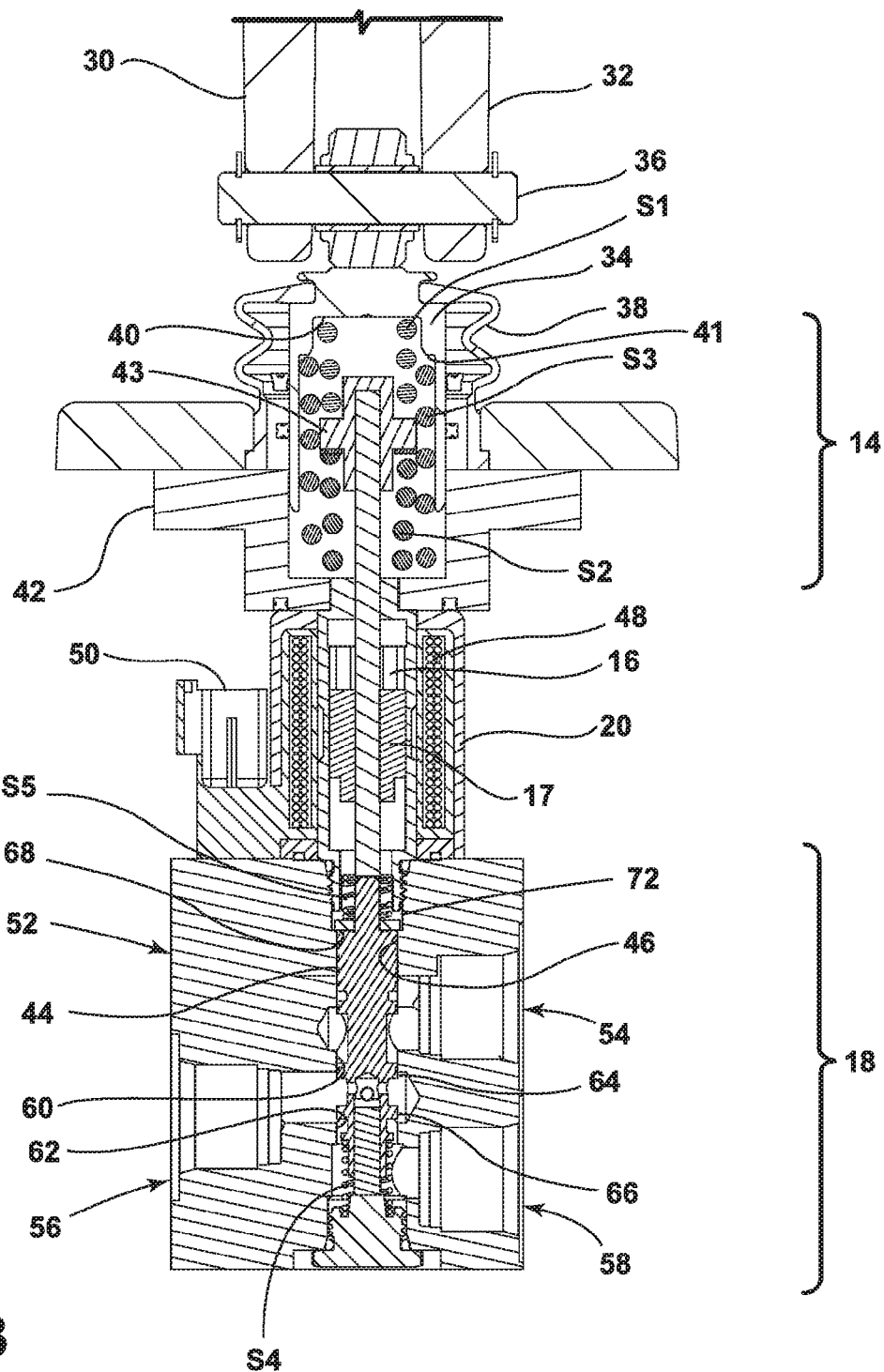
FIG. 3 is a cross-sectional view of the electro-hydraulic modulating valve pedal assembly of FIGS. 1-2.

Referring to FIGS. 1-3, an electro-hydraulic modulating valve pedal assembly in accordance with one embodiment is illustrated and generally designated 10. The electro-hydraulic pedal assembly 10 generally includes a foot pedal 12 pivotably mounted to a base 14, an internal push rod 16 (or armature) mechanically coupled to the foot pedal 12, a three-position spool valve 18 that is configured to vary a hydraulic output in response to the force exerted on the push rod 16, and a solenoid assembly 20 between the base 14 and the spool valve 18, the solenoid assembly 20 being magnetically coupled to the push rod 16. Each such feature of the electro-hydraulic pedal assembly 10 is separately discussed below.

The foot pedal 12 generally includes a pedal body 22 with an upward-facing contact surface 24. As shown in FIGS. 1 and 2, the pedal body 22 is pivotably secured to the base 14 with an axle 26. More specifically, the axle 26 is collared by left and right bearing journals 28 extending upwardly from the base 14. The axle 26 therefore defines a primary pivot axis, about which the pedal body 22 can rotate. The foot pedal 12 also includes left and right connector flanges 30, 32 extending downwardly from the pedal body 22 and coupled to a piston 34. The connector flanges 30, 32 are in alignment with each other and receive a pivot shaft 36 joined to the piston 34, which is contained within a protective boot 38. The pivot shaft 36 is parallel to the primary pivot axis, such that rotation of the pedal body 22 results in downward travel of the piston 34 into an internal chamber within the base 14 of the pedal assembly.

A cross-section of the foot pedal piston 34 in the neutral position is shown in FIG. 3. The foot pedal piston 34 defines a first seat 40 for a first spring S1, the first spring being in series with a second spring S2. The foot pedal piston 34 also defines a second seat 41 for a third spring S3, the third spring S3 being in parallel with the first and second springs S1, S2. The uppermost portion of the push rod 16 is captured within an intermediate retainer 43, such that downward movement of the retainer 43 results in downward movement of the push rod 16. The lower portions of the second spring S2 and the third spring S3 are seated against an upward-facing shoulder 42. The second spring S2 is held captive between the retainer 43 and the upward-facing shoulder 42, and the third spring S3 is held captive between the second seat 41 and the upward-facing shoulder 42.

In the neutral position shown in FIG. 3, the first and second springs S1, S2 are not compressed. In addition, the first spring S1 is slightly stronger than the second spring S2, with the difference in spring constants providing a downward force to the retainer 43, the downward force being comparable to the force generated by the solenoid assembly 20. The force from the solenoid assembly 20 and the foot pedal 12 is additive, such that applying both at the same time can result in a higher valve pressures if desired.

Referring again to FIG. 3, downward travel of the foot pedal piston 34 is opposed by each spring S1, S2, S3 and causes downward travel of the push rod 16. The push rod 16 extends through the solenoid assembly 20 and is surrounded by a magnetic armature 17, the push rod 16 being joined to a spool 44 within a central bore 46 of the spool valve 18. Activation of the solenoid coil 48 also causes downward travel of the push rod 16 (the push rod 16 being joined to the armature 17), which is opposed by the second spring S2. In this regard, the cumulative spring force that opposes downward travel of a solenoid-only-actuated push rod 16 is less than the cumulative spring force that opposes downward travel of a pedal-only-actuated push rod 16, thereby accounting for the different forces generated by the solenoid assembly 20 and the foot pedal 12.

Each spring S1, S2, S3 is a compression coil spring in the illustrated embodiment, but can be a wave spring in other embodiments. The compression coil spring or the wave spring can be linear or progressive, optionally a dual-rate coil spring, further optionally a progressive coil spring. The armature 17 is formed of a ferromagnetic material, for example iron, and extends concentrically through a central bore of the pedal assembly 10. The solenoid coil 48 surrounds at least a portion of the armature 17 for applying a magnetic force and driving the push rod 16 in a first (downward) direction, the magnetic force being proportional to the electrical current supplied to the solenoid coil 48. The solenoid assembly 20 additionally includes a socket 50 for power cables, which provide the electrical current to the solenoid coil 48.

As also shown in FIG. 3, the spool valve 18 includes a valve body 52 defining a pressure port 54, a work port 56, and a tank port 58. The pressure port 54 provides a connection for a source of pressurized hydraulic fluid, for example a hydraulic pump or an accumulator. The work port 54 provides a connection for a working unit, for example a hydraulic cylinder or a brake. Lastly, the tank port 58 provides a connection for a tank or a hydraulic reservoir. In accordance with SAE standards, each port includes a conventional straight thread for connection to one or more conduits. The spool valve 18 further includes a bore 46 in alignment with the push rod 16 of the solenoid assembly 20. The spool valve 18 also includes a return spring S4 that biases the spool 44 in the de-energized direction (upwardly as shown in FIG. 3). Consequently, the return spring S4 acts to return the push rod 16 to the neutral position when the solenoid assembly 20 is de-energized. Further, the amount of force applied to the push rod 16 is proportional to the amount of brake pressure being applied.

More specifically, each of the ports 54, 56, and 58 are in fluid communication with the bore 46. The bore 46 includes a first annular surface 60 and a second annular surface 62 on either side of the work port 56. These surfaces cooperate with the spool 44 to selectively direct fluid to the work port 56. The spool 44 includes a first annular portion 64 and a second annular portion 66. These annular portions are configured to coincide with the first annular surface 60 and the second annular surface 62 of the bore 46. The spool 44 also includes a shoulder 68 proximate the upper end of the spool valve 18. Also at the upper end of the spool valve 18, a fifth spring S5 is disposed in the bore 46, the fifth spring S5 optionally being a compression coil spring. A washer 72 is disposed between the shoulder 68 and the fifth spring S5 to provide a mechanical stop to the spring compression. In addition, the washer 72 functions to define the neutral position of the spool 44, which allows a faster release of work port pressure than would otherwise be possible.

In use, when pressurized fluid is desired at the working port 56, the foot pedal 12 is manually compressed and/or the solenoid coil 48 is energized. The push rod 16 moves in the first (downward) direction, causing the spool 44 to likewise move in the first (downward) direction. The first, second, third, and fourth springs S1, S2, S3, S4 provide the desired pedal feel during compression of the foot pedal 12. If the solenoid coil 48 is energized without movement of the foot pedal 12, only the second spring S2 and the fourth spring S4 oppose downward travel of the push rod 16, and the piston 34 remains in the neutral position. In this position, pressurized fluid is permitted to flow from the pressure port 54 to work port 56 for operation of a working unit. At the same time, fluid flow to the tank port 58 is obstructed by a close fit between the lower annular surface 62 of the valve body and the lower annular portion 66 of the spool 44. Upon the desired release of the pressurized fluid, the foot pedal 12 is depressed and/or the solenoid coil 48 is de-energized. The spool 44 moves in the second (upward) direction by the force from the second spring S2 and the fourth spring S4 and by the imbalance of fluid pressure forces acting on the spool 44. The combination of the return spring force and the force resulting from residual work port pressure compresses the fifth spring S5 and shifts the spool 44 in the second (upward) direction. In this neutral position, shown in FIG. 3, the necessary fluid flow need only accommodate leaking from the pressure port 54 into the bore 46 (exiting through the tank port 58) to prevent unwanted pressure buildup from actuating a working unit coupled to the working port 56.

Figure 4:
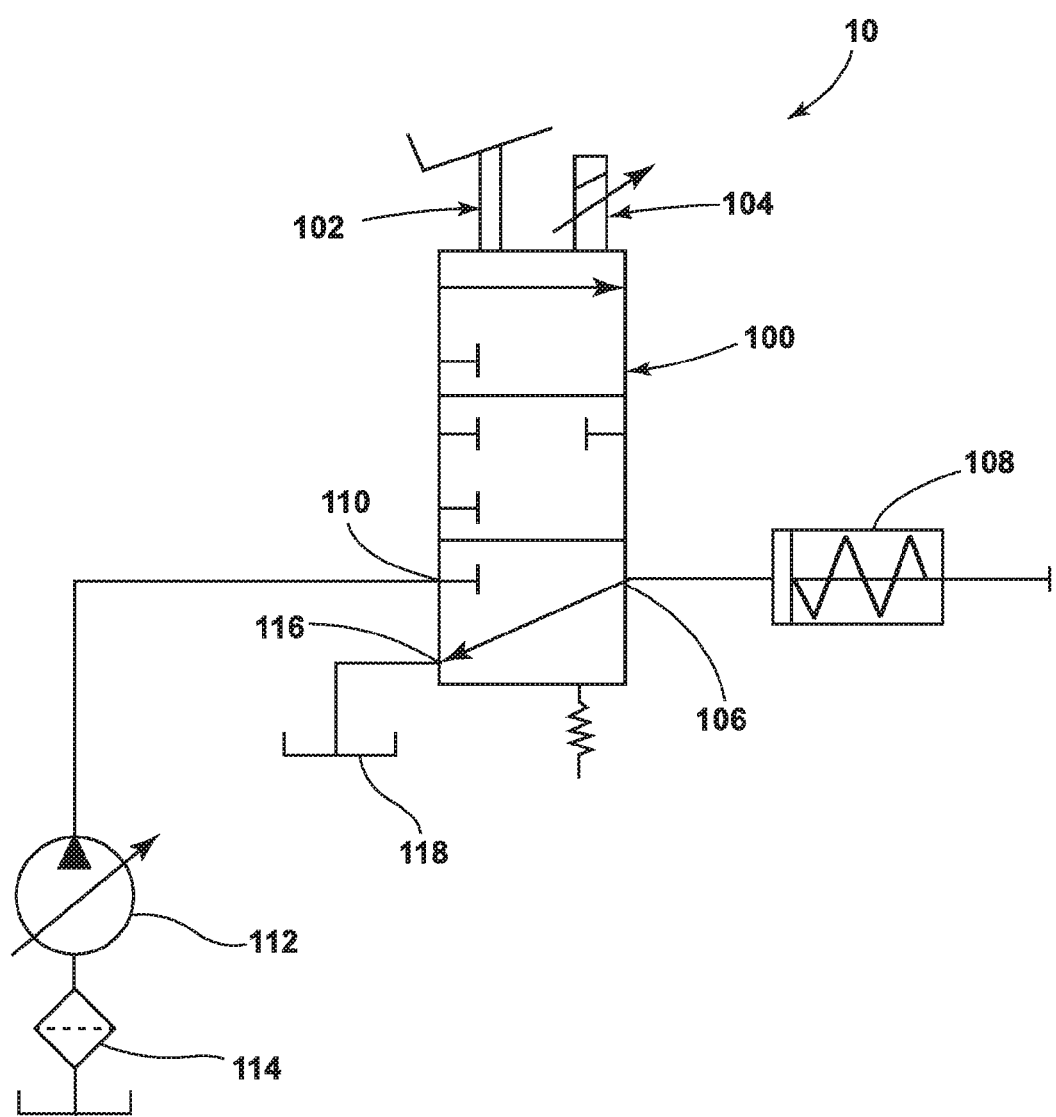
FIG. 4 is a hydraulic circuit diagram of the electro-hydraulic modulating valve pedal assembly of FIGS. 1-3.

Referring now to FIG. 4, a hydraulic circuit diagram for the electro-hydraulic pedal assembly 10 is illustrated. The electro-hydraulic pedal assembly 10 is depicted as a three-position valve 100 having two valve operators: a pedal 102 and a solenoid 104. The valve operators 102, 104 function independently of each other and in parallel, such that the valve 100 can respond to actuation by the pedal 102 independently of the energized state of the solenoid 100 and can respond to actuation by the solenoid 104 independently of the position of the pedal 102. The working port 106 is coupled to a working unit 108, the pressure port 110 is coupled to a hydraulic pump 112 and optional filter 114, and the tank port 116 is coupled to a hydraulic reservoir 118. In the first (neutral) position as shown in FIG. 4, the working port 106 is coupled to the tank port 116 to prevent unwanted pressure buildup from actuating the working unit 108. In the second (intermediate) position, all three ports are closed off from each other. In the third (open) position, the pressure port 110 is coupled to the working port 106. The solenoid 104 of the electro-hydraulic pedal assembly 10 is especially well suited for electronic control systems, including brake ECUs for ABS braking, emergency braking, semi-autonomous operation, and other applications.

Figure 5:
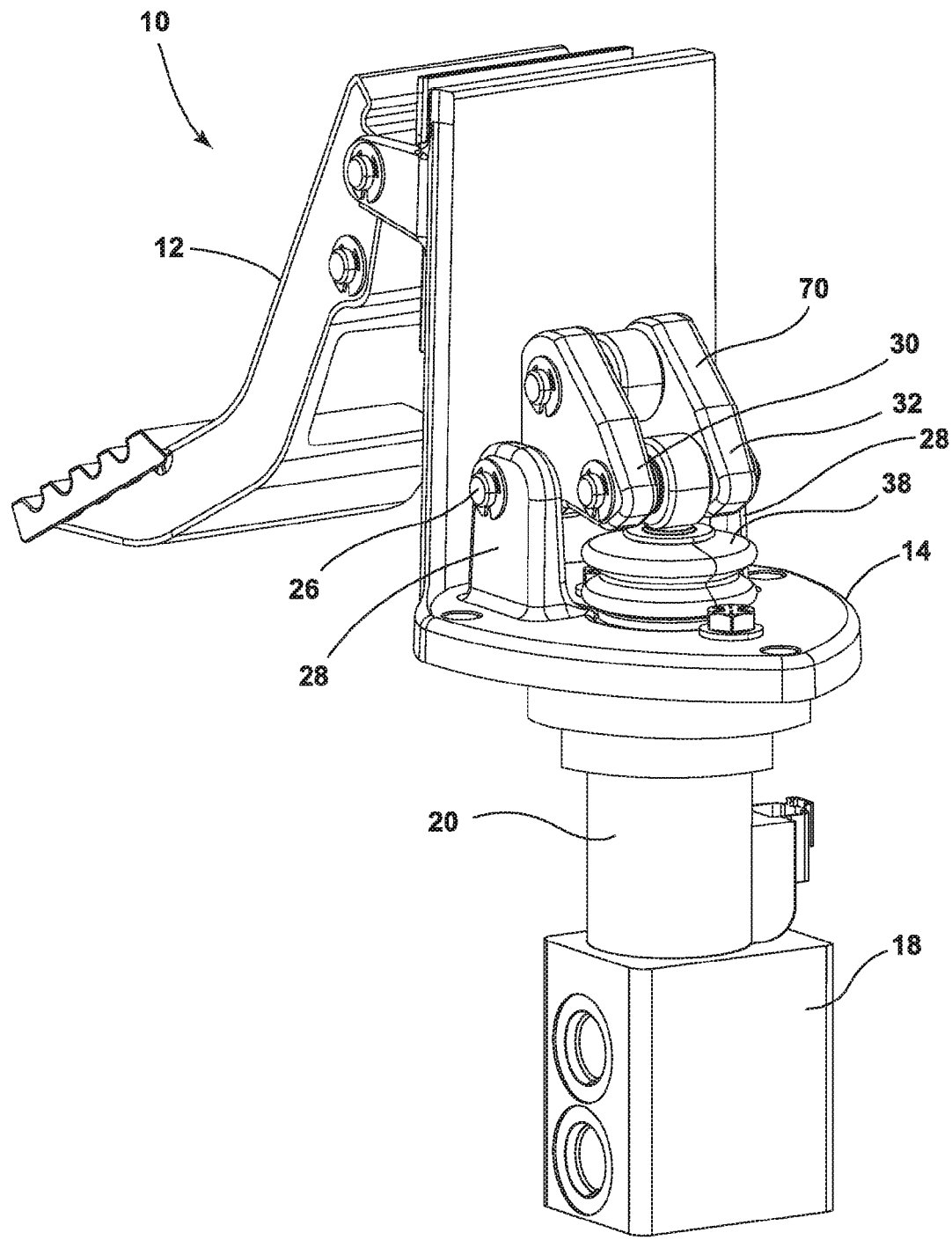
FIG. 5 is a perspective view of the electro-hydraulic modulating valve pedal assembly of FIG. 1 modified to include a wall mounted foot pedal.

As noted above in connection with FIGS. 1-3, the electro-hydraulic modulating valve pedal assembly 10 includes a floor-mounted foot pedal 12 for actuating a piston 34. As alternatively shown in FIG. 5, the assembly 10 can include a wall-mounted foot pedal 12. This embodiment is structurally and functionally similar to the embodiment of FIGS. 1-3, except that compression of the foot pedal 12 of FIG. 5 causes a bracket assembly 70 to rotate clockwise (as viewed in FIG. 5) about the axle 26. The axle 26 is collared by the left and right bearing journals 28 extending upwardly from the base 14. Consequently, compression of the foot pedal 12 results in downward travel of the piston 34 substantially in the manner set forth above in connection with the embodiment of FIGS. 1-3. Still other embodiments of the wall-mounted pedal 12 include an inverted-vertical configuration, such that the spool valve 18 is positioned vertically above the solenoid assembly 20.

Figure 6:
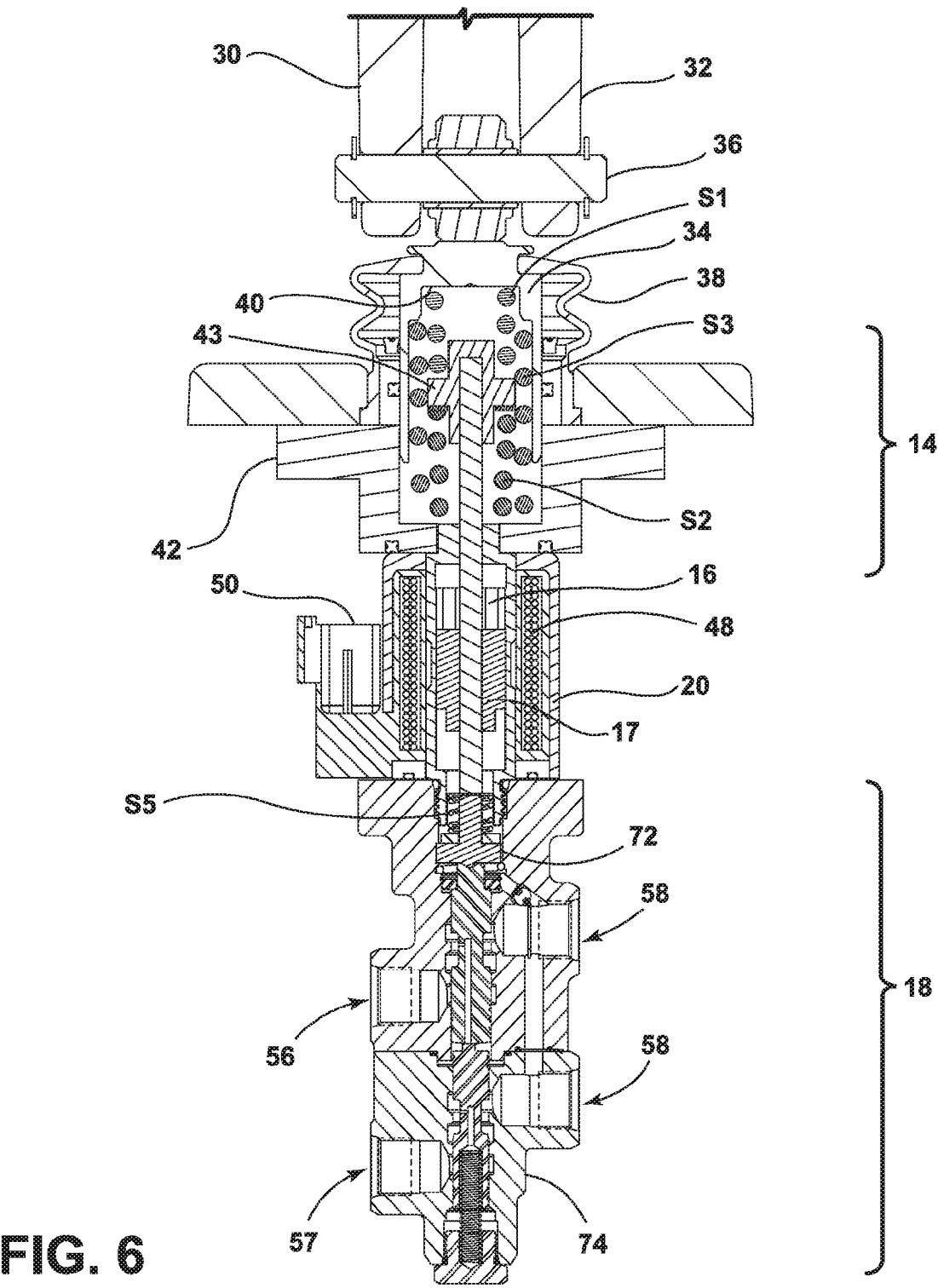
FIG. 6 is a cross-sectional view of the electro-hydraulic modulating valve pedal assembly of FIG. 1 modified to include a tandem valve assembly.

Referring now to FIG. 6, a further embodiment of the electro-hydraulic modulating valve pedal assembly 10 is illustrated. This embodiment is structurally and functionally similar to the embodiment of FIGS. 1-3, except that the spool valve 18 includes a tandem modulating valve. As a tandem modulating valve, the spool valve 18 of FIG. 6 includes: a primary work port 56, a secondary work port 57, primary and secondary tank ports 58 in fluid communication with each other, and primary and secondary pressure ports (not visible). The primary work port 56, the primary tank port 58, and the primary pressure port are contained within an upper valve housing 72. Similarly, the secondary work port 56, the secondary tank port 58, and the secondary pressure port are contained within a lower valve housing 74. The push rod-actuated tandem spool valve 18 can be actuated substantially as set forth above in connection with the embodiment of FIGS. 1-3. In particular, the electro-hydraulic modulating valve pedal assembly 10 is adapted to control the flow of hydraulic fluid to the primary and secondary work ports 56, 57 manually through actuation of the foot pedal 12, electrically through energization of the solenoid coil 48, or cooperatively through actuation of the foot pedal 12 and energization of the solenoid coil 28 simultaneously.

Figure 7:
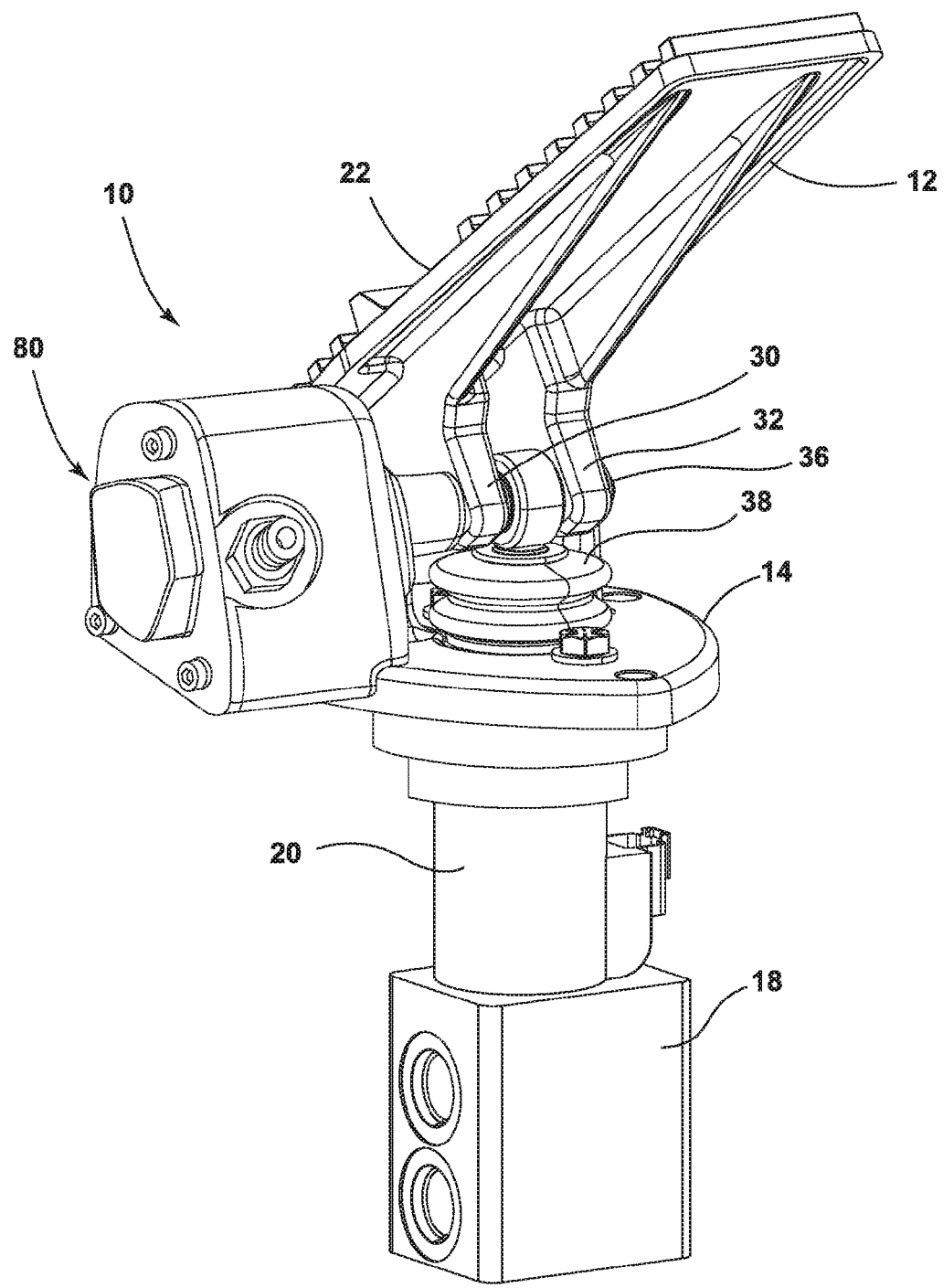
FIG. 7 is a perspective view of the electro-hydraulic modulating valve pedal assembly of FIG. 1 further including a Hall Effect sensor.

Referring now to FIG. 7, a further embodiment of the electro-hydraulic modulating valve pedal assembly 10 is illustrated. The embodiment of FIG. 7 is structurally and functionally similar to the embodiment of FIGS. 1-3, except that the embodiment of FIG. 7 includes a sensor 80 for measuring the angular position of the foot pedal 12 directly or indirectly. The sensor 80 is a Hall Effect sensor (single or dual) in the current embodiment, but can include other contact or non-contact sensors in other embodiments. As also shown in FIG. 7, the Hall Effect sensor 80 is adapted to measure the position of the pivot shaft 36, which also corresponds to the angular position of the pedal 12 and the linear position of the piston 34. The Hall Effect sensor 80 provides an output, for example a pulse-width-modulated digital output that is indicative of the then-existing position of the pivot shaft 36. The output of the Hall Effect sensor 80 is then provided to an electronic control unit, for example a brake ECU. The brake ECU (or other electronic control unit) can then control operation of ABS systems (or other systems) with improved accuracy over existing systems. While illustrated in connection with a single modulating valve 18, the Hall Effect sensor 80 can also be used in combination with the tandem modulating valve 18 of FIG. 6 in the same manner as set forth above.

The above description is that of current embodiments. Various alterations and changes can be made without departing from broader aspects of the invention as defined in the appended claims, which are to be interpreted in accordance with the principles of patent law including the doctrine of equivalents. This disclosure is presented for illustrative purposes and should not be interpreted as an exhaustive description of all embodiments or to limit the scope of the claims to the specific elements described in connection with these embodiments. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. An electro-hydraulic modulating valve pedal assembly comprising:
   a foot pedal pivotably mounted to a base;
   a push rod operatively coupled to the pedal, such that rotation of the foot pedal relative to the base causes travel of the push rod in a first direction, the push rod including an armature;
   a spool valve including a spool contained within a valve body having a pressure port, a work port, and a tank port, wherein the spool is operatively coupled to the push rod; and
   a solenoid surrounding at least a portion of the armature for applying a magnetic force to the push rod and driving the push rod in the first direction, wherein the foot pedal and the solenoid are first and second valve operators for the spool valve and independently cause the spool to move in the first direction between a first position in which the work port is closed to the pressure port and a second position in which the work port is open to the pressure port.

2. The assembly of claim 1 wherein the solenoid includes a conductive winding surrounding the armature, the solenoid being disposed between the foot pedal and the spool valve.

3. The assembly of claim 1 wherein the spool valve includes a return spring for biasing the spool in a second direction opposite of the first direction.

4. The assembly of claim 1 wherein the tank port is open to the work port in the second position of the spool valve.

5. The assembly of claim 1 wherein the foot pedal and the solenoid are parallel connected such that the foot pedal and the solenoid actuate the push rod independently of each other or in tandem with each other.

6. The assembly of claim 1 wherein the spool is contained within a central bore in the valve body, the spool including first and second annular portions that project radially therefrom and engage a cylindrical sidewall of the bore on opposing sides of the work port.

7. The assembly of claim 1 further including a piston coupled to the foot pedal and extending into an opening in the base, the foot pedal being biased in a second direction opposite of the first direction by a coil spring contained within the piston.

8. The assembly of claim 1 wherein the armature is formed of a ferromagnetic material and extends through a central bore of the solenoid.

9. An electro-hydraulic modulating valve pedal assembly comprising:
a solenoid including a solenoid housing defining a central bore, a conductive winding extending around the central bore, and an armature within the central bore;
a foot pedal pivotably mounted to a base and extending over the solenoid, the foot pedal including a foot pedal piston that is mechanically coupled to the solenoid armature; and
a hydraulic valve including a spool contained within a valve body having a pressure port, a work port, and a tank port, wherein the spool is operatively coupled to the armature, wherein the solenoid and the foot pedal are first and second valve operators for the hydraulic valve and independently cause the spool to move from a first position in which the work port is closed to the pressure port to a second position in which the work port is open to the pressure port.

10. The assembly of claim 9 wherein the solenoid and the foot pedal are parallel connected such that the solenoid and the foot pedal actuate the armature independently of each other or in tandem.

11. The assembly of claim 9 wherein the spool is contained within a central bore in the valve body, the spool including first and second annular portions that project radially therefrom and engage a cylindrical sidewall of the central bore on opposing sides of the work port.

12. The assembly of claim 9 wherein the spool valve includes a return spring for biasing the spool toward the foot pedal.

13. An electro-hydraulic pedal assembly comprising:
a solenoid including an armature surrounded by a conductive winding, such that energizing the conductive winding causes the armature to travel in a first direction;
a foot pedal including a piston that is mechanically coupled to the solenoid armature, such that depression of the foot pedal causes the armature to travel in the first direction; and
a hydraulic valve including a spool that is responsive to the position of the armature and is contained within a valve body having a pressure port, a work port, and a tank port, such that the solenoid and the foot pedal are first and second valve operators that independently cause the spool to move from a first position in which the work port is closed to the pressure port to a second position in which the work port is open to the pressure port.

14. The assembly of claim 13 wherein the solenoid and the foot pedal are parallel connected such that the solenoid and the foot pedal actuate the armature independently of each other.

15. The assembly of claim 13 wherein the spool is contained within a central bore in the valve body, the spool including first and second annular portions that project radially therefrom and engage a cylindrical sidewall of the central bore on opposing sides of the work port.

16. The assembly of claim 13 wherein the piston comprises a cylindrical housing containing first and second coil springs that are connected in series with each other and a third coil spring that is connected in parallel with the first and second coil springs.

17. The assembly of claim 16 further including a retainer between the first coil spring and the second coil spring, an upper portion of the armature being contained within the retainer.

18. The assembly of claim 13 wherein the foot pedal is a floor mounted pedal or a wall mounted pedal.

19. The assembly of claim 13 wherein the spool valve is a tandem spool valve including a second pressure port, a second work port, and a second tank port.

20. The assembly of claim 13 further including a Hall Effect sensor configured to measure the angular position of at least a portion of the foot pedal.

* * * * *